US008616851B2

(12) United States Patent
DiDomizio et al.

(10) Patent No.: US 8,616,851 B2
(45) Date of Patent: Dec. 31, 2013

(54) MULTI-ALLOY ARTICLE, AND METHOD OF MANUFACTURING THEREOF

(75) Inventors: Richard DiDomizio, Scotia, NY (US); Matthew Joseph Alinger, Albany, NY (US); Samuel Vinod Thamboo, Latham, NY (US); Raymond Joseph Stonitsch, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 877 days.

(21) Appl. No.: 12/757,705

(22) Filed: Apr. 9, 2010

(65) Prior Publication Data
US 2011/0250074 A1 Oct. 13, 2011

(51) Int. Cl.
*F01D 5/02* (2006.01)

(52) U.S. Cl.
USPC ............... 416/223 R; 416/241 R; 416/223 A; 29/889.2; 29/889.23

(58) Field of Classification Search
USPC .................. 416/223 R, 241 R, 223 A, 244 A; 29/889.2, 889.23
See application file for complete search history.

(56) References Cited

U.S. PATENT DOCUMENTS

| 4,111,603 | A | 9/1978 | Stahl | |
|---|---|---|---|---|
| 5,161,950 | A * | 11/1992 | Krueger et al. | 416/204 R |
| 7,238,005 | B2 | 7/2007 | Takahashi et al. | |
| 7,722,330 | B2 * | 5/2010 | Seth | 416/223 R |
| 2008/0253894 | A1 * | 10/2008 | Arrell et al. | 416/204 A |

FOREIGN PATENT DOCUMENTS

| EP | 1952915 A1 * | 8/2008 |
|---|---|---|
| WO | 99/02862 A2 | 1/1999 |

* cited by examiner

*Primary Examiner* — Igor Kershteyn
(74) *Attorney, Agent, or Firm* — Jenifer Haecki

(57) ABSTRACT

An article includes a first section extending from an outer periphery to a predetermined surface located inward from the outer periphery. The first section comprises a nanostructured ferritic alloy. The article includes a second section extending from an inner periphery to the predetermined surface located outward from the inner periphery. The second section comprises at least one other alloy different from the nanostructured ferritic alloy.

24 Claims, 1 Drawing Sheet

MULTI-ALLOY ARTICLE, AND METHOD OF MANUFACTURING THEREOF

BACKGROUND

Turbomachines such as heavy-duty gas turbines and jet engines operate in extreme environments, exposing the turbine components, especially those in the turbine hot section, to high operating temperatures and stresses. In order to maintain the mechanical integrity of hot section components, one of two approaches is conventionally used. In one approach, cooling air is used to reduce the part's effective temperature. In a second approach, the component size is increased to reduce the stresses. However, these approaches can reduce the efficiency of the turbine and increase the cost.

In order for the turbine components to endure the high temperatures and stresses in the hot section, they are manufactured from a material capable of withstanding these severe conditions. In certain applications, superalloys have been used in these demanding applications, because superalloys maintain their strength at up to 90% of their melting temperature and have excellent environmental resistance. In certain other applications, nickel-based superalloys, in particular, have been used extensively throughout gas turbine engines, e.g., in turbine blade, nozzle, wheel, spacer, disk, spool, blisk, and shroud applications. In some lower temperature and stress applications, steels may be used for manufacturing turbine components. However, conventional steels cannot currently be used in high temperature and high stress applications because they do not meet the necessary mechanical property requirements.

In particular, for heavy duty land based gas turbine wheels operating at higher temperatures, for example at operating temperatures greater than approximately 1000 degrees Fahrenheit, conventional steels do not have the necessary mechanical properties. As a result, nickel-based superalloys strengthened with a gamma double prime phase are conventionally used in such applications. However, at such higher temperatures, the hold time crack growth resistance (HTFCG) of most gamma double prime strengthened nickel-based superalloys may not meet design requirements.

It should be noted that for heavy duty gas turbine wheels, critical mechanical properties change from the bore to the rim of the wheel. For example, the bore is limited by burst strength, and hence would require a higher ultimate tensile strength. The rim is limited by a material's creep life and its resistance to HTFCG. Many gamma double prime nickel-based superalloys cannot meet the HTFCG resistance required at elevated temperatures.

Accordingly, it is desirable to have an enhanced alloy article, that is capable of maintaining its mechanical integrity over a range of conditions ranging from higher stress/lower temperature to higher temperature/lower stress.

SUMMARY

In accordance with one exemplary embodiment of the present invention, an article includes a first section extending from an outer periphery to a predetermined surface located inward from the outer periphery. The first section comprises a nanostructured ferritic alloy. The article includes a second section extending from an inner periphery to the predetermined surface located outward from the inner periphery. The second section comprises at least one other alloy different from the nanostructured ferritic alloy.

In accordance with another exemplary embodiment of the present invention, a turbomachinery component is disclosed.

In accordance with another exemplary embodiment of the present invention, a method for manufacturing the article is disclosed.

BRIEF DESCRIPTION OF THE DRAWINGS

These and other features, aspects, and advantages of embodiments of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skilled in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item. If ranges are disclosed, the endpoints of all ranges directed to the same component or property are inclusive and independently combinable (for example, ranges of "up to about 25 wt. %, or, more specifically, about 5 wt. % to about 20 wt. %," is inclusive of the endpoints and all intermediate values of the ranges of "about 5 wt. % to about 25 wt. %," or the like). The modifier "about" used in connection with a quantity is inclusive of the stated value and has the meaning dictated by the context (for example, includes the degree of error associated with measurement of the particular quantity).

The invention relates generally to a multi-alloy article, and a method of manufacturing the multi-alloy article, and more particularly, to a dual-alloy article having a first section extending from an outer periphery of an article to a predetermined surface located inward from the outer periphery made of a nanostructured ferritic alloy and, a second section extending from an inner periphery of the article to the predetermined surface located outward from the inner periphery made of another alloy that is different from the nanostructured ferritic alloy used in the first section. It should be noted herein that the term "other alloy" discussed herein refers to a different class alloy than the nanostructured ferritic alloy. It should also be noted that in certain embodiments, more than one other alloy may be used in the second section.

In accordance with the embodiments discussed herein below, a multi-alloy article is disclosed. In certain exemplary embodiments, a dual-alloy article includes a turbomachinery component. The article includes a first section extending from an outer periphery of the article to a predetermined surface located inward from the outer periphery. The first section includes a nanostructured ferritic alloy. The article further includes a second section extending from an inner periphery of the article to the predetermined surface located outward from the inner periphery. The second section comprises at least one other alloy different from the nanostructured ferritic alloy.

Figure 1:
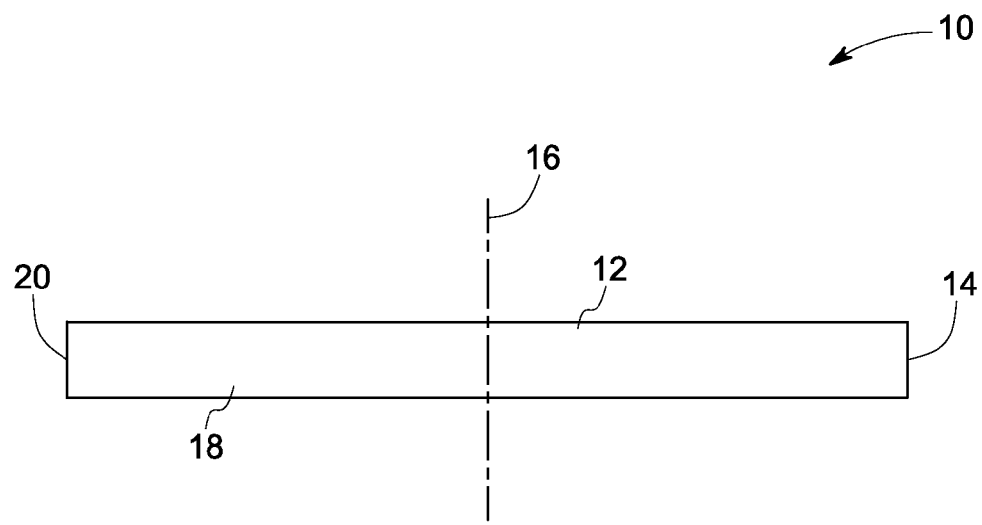
FIG. 1 is a diagrammatical representation of a multi-alloy article in accordance with an exemplary embodiment of the present invention.

Referring to FIG. 1, an article 10 in accordance with an exemplary embodiment of the present invention is disclosed. In the illustrated embodiment, the article 10 includes a dual-alloy article. In certain other embodiments, the article 10 may be a multi-alloy article i.e. the article 10 may include more than two alloys. In the illustrated embodiment, the article 10 includes a first section 12 extending from an outer periphery 14 to a predetermined surface 16. The first section 12 includes a nano structured ferritic alloy. The article 10 further includes a second section 18 extending from an inner periphery 20 to the predetermined surface 16. The second section 18 includes at least one other alloy different from the nano structured ferritic alloy. In one embodiment, the article 10 may be a turbomachinery component. In other embodiments, the article 10 may also be applicable for any other applications involving operation at higher temperatures. In one embodiment, the article 10 is a heavy-duty gas turbine wheel. In another embodiment, the article 10 may be a heavy-duty gas turbine spacer. In yet another embodiment, the article 10 may be a turbomachinery component used in aerospace applications. In yet another embodiment, the article 10 may be a jet engine disk.

Figure 2:
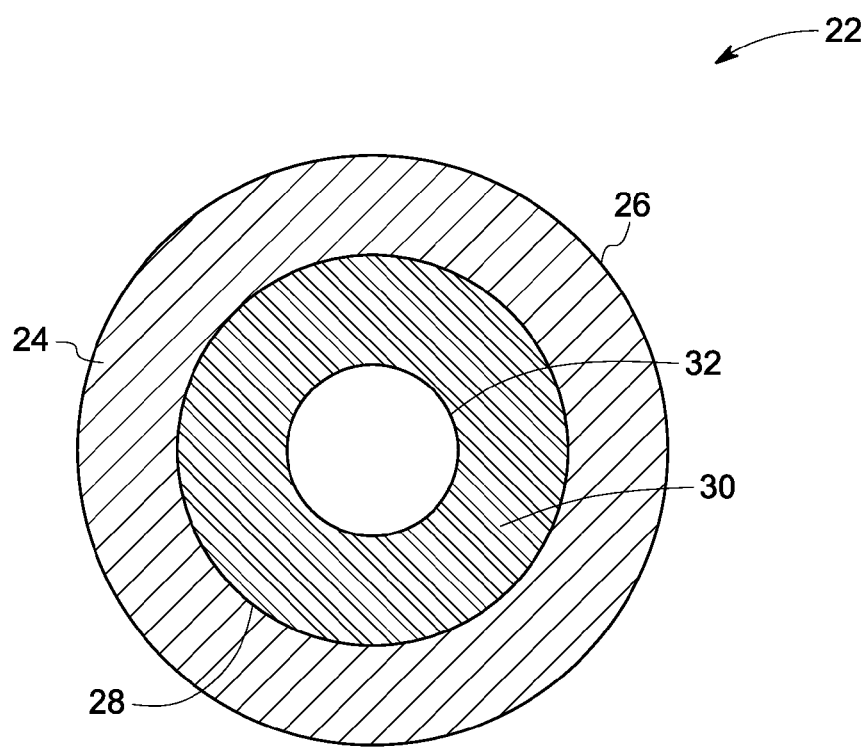
FIG. 2 is a top-down cross-section of a dual-alloy gas turbine wheel, in accordance with an exemplary embodiment of the present invention.

Referring to FIG. 2, a top-down cross-section of a turbomachinery component 22 is illustrated. The turbomachinery component 22 is similar to the article 10 of the previous embodiment. In the illustrated embodiment, the turbomachinery component 22 includes a dual-alloy component. In certain other embodiments, the component 22 may be a multi-alloy component i.e. the component 22 may include more than two alloys. The illustrated component 22 is a heavy-duty gas turbine wheel.

In the illustrated embodiment, the component 22 includes a first section 24 extending from a rim 26 (outer periphery) to a predetermined surface 28. The first section 24 includes a nanostructured ferritic alloy. The component 22 further includes a second section 30 extending from a bore 32 (inner periphery) to the predetermined surface 28. The second section 30 includes at least one other alloy different from the nanostructured ferritic alloy. It should be noted herein that although the below details are discussed with reference to FIG. 2, the details are also equally applicable to the embodiment of FIG. 1.

As discussed previously, critical mechanical properties change from the bore to the rim of a heavy-duty turbine wheel. For example, the bore is limited by burst strength, and hence would require a higher ultimate tensile strength. The rim is limited by a material's creep life and its resistance to HTFCG. Conventionally, the gamma double prime nickel-based superalloys cannot meet the HTFCG resistance required at elevated temperatures.

The nanostructured ferritic alloy of the first section 24 comprises a stainless steel matrix that is dispersion strengthened by a very high density, for example, at least about $10^{18}$ $m^{-3}$, or at least about $10^{20}$ $m^{-3}$, or even at least about $10^{22}$ $m^{-3}$ of nanometer-scale, for example, from about 1 nanometer to about 100 nanometers, or from about 1 nanometer to about 50 nanometers, or from about 1 nanometer to about 10 nanometers, nanofeature including titanium oxide and at least one other element from the oxide used to prepare the nanostructured ferritic alloy or the alloy matrix. For example, yttrium oxide, aluminum oxide, zirconium oxide, hafnium oxide may be used to prepare the NFA, in which case, the nanofeatures may comprise yttrium (Y), aluminum (Al), zirconium (Z), hafnium (Hf) or combinations thereof. Transition metals, such as iron, chromium, molybdenum, tungsten, manganese, silicon, niobium, aluminium, niobium, or tantalum from the alloy matrix may also participate in the creation of the nanofeatures.

In a nanostructured ferritic alloy, the majority, if not substantially all, of the added oxide is dissolved into the alloy matrix during powder attrition and participates in the formation of the aforementioned nanofeatures when the powder is raised in temperature during the consolidation process. As described above, the new oxide in the nanostructured ferritic alloy may include the transition metals present in the base alloy as well as the metallic element(s) of the initial oxide addition. In one embodiment, the nanostructured ferritic alloy matrix comprises a ferritic stainless steel. In certain other embodiments, the nanostructured ferritic alloy matrix may comprise a martensitic, duplex, austenitic stainless, or precipitation hardened steel.

In one exemplary embodiment, the nanostructured ferritic alloy includes from about 5 weight percentage to about 30 weight percentage chromium, from about 0.1 weight percentage to about 2 weight percentage titanium, from about 0 weight percentage to about 5 weight percentage molybdenum, from about 0 weight percentage to about 5 weight percentage tungsten, from about 0 weight percentage to about 5 weight percentage manganese, from about 0 weight percentage to about 5 weight percentage silicon, from about 0 weight percentage to about 2 weight percentage niobium, from about 0 weight percentage to about 2 weight percentage aluminum, from about 0 weight percentage to about 8 weight percentage nickel, from about 0 weight percentage to about 2 weight percentage tantalum, from about 0 weight percentage to about 0.5 weight percentage carbon, and from about 0 weight percentage to about 0.5 weight percentage nitrogen, with the balance weight percentage being iron and incidental impurities; and a number density of at least about $10^{18}$ $m^{-3}$ nanofeatures including titanium oxide and at least one element from an oxide added during formation of the nanostructured ferritic alloy, or from the alloy matrix.

In another exemplary embodiment, the nanostructured ferritic alloy includes from about 9 weight percentage to about 20 weight percentage chromium, from about 0.1 weight percentage to about 1 weight percentage titanium, from about 0 weight percentage to about 4 weight percentage molybdenum, from about 0 weight percentage to about 4 weight percentage tungsten, from about 0 weight percentage to about 2.5 weight percentage manganese, from about 0 weight percentage to about 2.5 weight percentage silicon, from about 0 weight percentage to about 1 weight percentage niobium, from about 0 weight percentage to about 1 weight percentage aluminum, from about 0 weight percentage to about 4 weight percentage nickel, from about 0 weight percentage to about 1 weight percentage tantalum, from about 0 weight percentage to about 0.2 weight percentage carbon, and from about 0 weight percentage to about 0.2 weight percentage nitrogen, with the balance weight percentage being iron and incidental impurities; and a number density of at least about $10^{20}$ $m^{-3}$ nanofeatures including titanium oxide and at least one element from an oxide added during formation of the nanostructured ferritic alloy, or from the alloy matrix.

In yet another exemplary embodiment, the nanostructured ferritic alloy includes from about 9 weight percentage to about 14 weight percentage chromium, from about 0.1 weight percentage to about 0.5 weight percentage titanium, from about 0 weight percentage to about 3 weight percentage molybdenum, from about 0 weight percentage to about 3 weight percentage tungsten, from about 0 weight percentage to about 1 weight percentage manganese, from about 0 weight percentage to about 1 weight percentage silicon, from about 0 weight percentage to about 0.5 weight percentage niobium, from about 0 weight percentage to about 0.5 weight percentage aluminum, from about 0 weight percentage to about 2 weight percentage nickel, from about 0 weight percentage to about 0.5 weight percentage tantalum, from about 0 weight percentage to about 0.1 weight percentage carbon, and from about 0 weight percentage to about 0.1 weight percentage nitrogen, with the balance weight percentage being iron and incidental impurities; and a number density of at least about $10^{22}$ m$^{-3}$ nanofeatures including titanium oxide and at least one element from an oxide added during formation of the nanostructured ferritic alloy, or from the alloy matrix.

As discussed above, the second section 30 includes at least one other alloy different from the nanostructured ferritic alloy. In one embodiment, the other alloy includes a martensitic steel and the nanostructured ferritic alloy comprises a martensitic steel matrix. In another embodiment, the other alloy includes a martensitic steel and the nanostructured ferritic alloy comprises a non-martensitic steel matrix. In yet another embodiment, the other alloy includes a ferritic steel and the nanostructured ferritic alloy comprises a ferritic steel matrix. In yet another embodiment, the other alloy includes a ferritic steel and the nanostructured ferritic alloy comprises a non-ferritic steel matrix. In yet another embodiment, the other alloy includes an austenitic steel and the nanostructured ferritic alloy comprises an austenitic steel matrix. In yet another embodiment, the other alloy includes an austenitic steel and the nanostructured ferritic alloy comprises a non-austenitic steel matrix. In yet another embodiment, the other alloy includes a duplex steel and the nanostructured ferritic alloy comprises a duplex steel matrix. In yet another embodiment, the other alloy includes a duplex steel and the nanostructured ferritic alloy comprises a non-duplex steel matrix. In yet another embodiment, the other alloy includes a precipitation hardened steel and the nanostructured ferritic alloy comprises a precipitation hardened steel matrix. In yet another embodiment, the other alloy includes a precipitation hardened steel and the nanostructured ferritic alloy comprises a non-precipitation hardened steel matrix. In yet another embodiment, the other alloy includes a nickel based superalloy strengthened with a gamma double prime phase and the nanostructured ferritic alloy comprises a ferritic, martensitic, austenitic, or duplex steel matrix. In yet another embodiment, the other alloy includes a nickel based superalloy strengthened with a gamma prime phase and the nanostructured ferritic alloy comprises a ferritic, martensitic, austenitic, or duplex steel matrix.

As discussed previously, the nanostructured ferritic alloy is located in the first section 24 extending from the rim 26 to the predetermined surface 28 and the other alloy, for example a martensitic steel is located in the second section 30 extending from the bore 32 to the predetermined surface 28. The predetermined surface 28 may be referred to as a "transition surface" between the first section 24 and the second section 30. The usage of the alloy material of the second section 30 as the matrix phase of the nanostructured ferritic alloy of the first section 24 works to limit the amount of material inter-diffusion that would occur at a joint during the service of the component 22, thus extending service life.

The component 22 may be manufactured using several techniques. In one embodiment, the first section 24 and the second section 30 are manufactured beforehand and then mutually joined. In another embodiment, the component 22 is manufactured by simultaneously consolidating and joining sections 24 and 30. In one embodiment, the method includes performing a single heat treatment of the first section 24 and the second section 30.

In one embodiment, the component 22 is formed by forge enhanced bonding. In such an embodiment, the manufacturing process includes isothermal forging of bore and rim preforms, HIP diffusion bonding of bore and rim preforms, isothermal finish forge operations to locally deform a bondline, and heat treating the forge bonded article to optimize the properties in the bore, rim and across the bondline.

In another embodiment, the component 22 is formed by electron beam welding (EBW) in which a beam of high-velocity electrons is applied to the materials being joined. The materials melt as the kinetic energy of the electrons is transformed into heat upon impact. The welding is often done in conditions of a vacuum to prevent dispersion of the electron beam.

In yet another embodiment, the component 22 is formed by solid state joining technique. This technique involves a joining process, which produces coalescence at temperatures essentially below the melting point of the base materials being joined, without the addition of brazing filler metal. The solid state joining may include inertia welding, translation friction welding, linear friction welding, consumable rod friction welding, projection welding, or the like.

In yet another embodiment, the component 22 is formed by diffusion bonding or activated diffusion bonding. In such a technique bonding occurs when two mating surfaces are pressed together under temperature, time and pressure conditions that allow atom interchange across the interface such that the interface effectively ceases to exist.

In yet another embodiment, a HIP can is filled with the nanostructured ferritic alloy powder located on a periphery and the second alloy powder located in a center. The can is then evacuated and HIP'd in order to fully densify the powder. The dual-alloy compact is then forged to the required shape.

The component 22 can be formed by any suitable method.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An article, comprising:
a first section extending from an outer periphery to a predetermined surface located inward from the outer periphery, wherein the first section comprises a nanostructured ferritic alloy; wherein the nanostructured ferritic alloy comprises from about 5 weight percentage to about 30 weight percentage chromium, from about 0.1 weight percentage to about 2 weight percentage titanium, from about 0 weight percentage to about 5 weight percentage molybdenum, from about 0 weight percentage to about 5 weight percentage tungsten, from about 0 weight percentage to about 5 weight percentage manganese, from about 0 weight percentage to about 5 weight percentage silicon, from about 0 weight percentage to about 2 weight percentage niobium, from about 0 weight percentage to about 2 weight percentage aluminum, from about 0 weight percentage to about 8 weight percentage nickel, from about 0 weight percentage to about 2 weight percentage tantalum, from about 0 weight percentage to about 0.5 weight percentage carbon, and from about 0 weight percentage to about 0.5 weight percentage nitrogen, with the balance weight percentage being iron and incidental impurities; and a number density of at least about 1018 m$^{-3}$ nanofeatures comprising tita- nium oxide and at least one element from an oxide added during formation of the nanostructured ferritic alloy, or from the alloy matrix; and a second section extending from an inner periphery to the predetermined surface located outward from the inner periphery, wherein the second section comprises at least one other alloy different from the nanostructured ferritic alloy.

2. The article of claim 1, wherein the nanostructured ferritic alloy comprises from about 9 weight percentage to about 20 weight percentage chromium, from about 0.1 weight percentage to about 1 weight percentage titanium, from about 0 weight percentage to about 4 weight percentage molybdenum, from about 0 weight percentage to about 4 weight percentage tungsten, from about 0 weight percentage to about 2.5 weight percentage manganese, from about 0 weight percentage to about 2.5 weight percentage silicon, from about 0 weight percentage to about 1 weight percentage niobium, from about 0 weight percentage to about 1 weight percentage aluminum, from about 0 weight percentage to about 4 weight percentage nickel, from about 0 weight percentage to about 1 weight percentage tantalum, from about 0 weight percentage to about 0.2 weight percentage carbon, and from about 0 weight percentage to about 0.2 weight percentage nitrogen, with the balance weight percentage being iron and incidental impurities; and a number density of at least about $10^{20}$ m$^{-3}$ nanofeatures comprising titanium oxide and at least one element from an oxide added during formation of the nanostructured ferritic alloy, or from the alloy matrix.

3. The article of claim 2, wherein the nanostructured ferritic alloy comprises from about 9 weight percentage to about 14 weight percentage chromium, from about 0.1 weight percentage to about 0.5 weight percentage titanium, from about 0 weight percentage to about 3 weight percentage molybdenum, from about 0 weight percentage to about 3 weight percentage tungsten, from about 0 weight percentage to about 1 weight percentage manganese, from about 0 weight percentage to about 1 weight percentage silicon, from about 0 weight percentage to about 0.5 weight percentage niobium, from about 0 weight percentage to about 0.5 weight percentage aluminum, from about 0 weight percentage to about 2 weight percentage nickel, from about 0 weight percentage to about 0.5 weight percentage tantalum, from about 0 weight percentage to about 0.1 weight percentage carbon, and from about 0 weight percentage to about 0.1 weight percentage nitrogen, with the balance weight percentage being iron and incidental impurities; and a number density of at least about $10^{22}$ m$^{-3}$ nanofeatures comprising titanium oxide and at least one element from an oxide added during formation of the nanostructured ferritic alloy, or from the alloy matrix.

4. The article of claims 1, wherein the at least one element comprises yttrium, aluminium, zirconium, hafnium, iron, chromium, molybdenum, tungsten, manganese, silicon, niobium, aluminium, niobium, tantalum, or combinations thereof.

5. The article of claim 1, wherein the at least one element comprises yttrium, aluminium, hafnium, or zirconium.

6. The article of claim 1, wherein the at least one other alloy comprises a martensitic steel, a ferritic steel, an austenitic steel, a duplex steel, or a precipitation hardened steel.

7. The article of claim 6, wherein the nanostructured ferritic alloy comprises a martensitic steel matrix, a non-martensitic steel matrix, a ferritic steel matrix, a non-ferritic steel matrix, an austenitic steel matrix, a non-austenitic steel matrix, a duplex steel matrix, a non-duplex steel matrix, a precipitation hardened steel matrix, a non-precipitation hardened steel matrix.

8. The article of claim 1, wherein the at least one other alloy comprises at least one of a nickel based superalloy strengthened with a gamma double prime phase or a nickel based superalloy strengthened with a gamma prime phase.

9. The article of claim 8, wherein the nanostructured ferritic alloy comprises at least one of a ferritic steel matrix, a martensitic steel matrix, an austenitic steel matrix, a duplex steel matrix, or a precipitation hardened steel matrix.

10. The article of claim 1, wherein the article comprises a turbomachinery component.

11. The article of claim 1, wherein the article comprises a heavy-duty turbine wheel.

12. The article of claim 1, wherein the article comprises a heavy-duty turbine spacer.

13. The article of claim 1, wherein the article comprises a jet engine disk.

14. The article of claim 1, wherein the article is manufactured by at least one of hot isostatic pressing and forging, forge enhanced bonding, solid state joining, activated diffusion bonding, diffusion bonding, e-beam welding, welding, or combinations thereof.

15. A turbomachinery component, comprising:
a first section extending from a rim to a predetermined surface located inward from the rim, wherein the first section comprises a nanostructured ferritic alloy, wherein the nanostructured ferritic alloy comprises from about 5 weight percentage to about 30 weight percentage chromium, from about 0.1 weight percentage to about 2 weight percentage titanium, from about 0 weight percentage to about 5 weight percentage molybdenum, from about 0 weight percentage to about 5 weight percentage tungsten, from about 0 weight percentage to about 5 weight percentage manganese, from about 0 weight percentage to about 5 weight percentage silicon, from about 0 weight percentage to about 2 weight percentage niobium, from about 0 weight percentage to about 2 weight percentage aluminum, from about 0 weight percentage to about 8 weight percentage nickel, from about 0 weight percentage to about 2 weight percentage tantalum, from about 0 weight percentage to about 0.5 weight percentage carbon, and from about 0 weight percentage to about 0.5 weight percentage nitrogen, with the balance weight percentage being iron and incidental impurities; and a number density of at least about 1018 m–3 nanofeatures comprising titanium oxide and at least one element from an oxide added during formation of the nanostructured ferritic alloy, or from the alloy matrix; and a second section extending from a bore to the predetermined surface located outward from the bore, wherein the second section comprises at least one other alloy different from the nanostructured ferritic alloy.

16. The turbomachinery component of claim 15, wherein the at least one other alloy comprises a martensitic steel, a ferritic steel, an austenitic steel, a duplex steel, or a precipitation hardened steel.

17. The turbomachinery component of claim 16, wherein the nanostructured ferritic alloy comprises a martensitic steel matrix, a non-martensitic steel matrix, a ferritic steel matrix, a non-ferritic steel matrix, an austenitic steel matrix, a non-austenitic steel matrix, a duplex steel matrix, a non-duplex steel matrix, a precipitation hardened steel matrix, or a non-precipitation hardened steel matrix.

18. The turbomachinery component of claim 15, wherein the at least one other alloy comprises a nickel based superalloy strengthened with a gamma double prime phase or a nickel based superalloy strengthened with a gamma prime phase.

19. The turbomachinery component of claim 18, wherein the nanostructured ferritic alloy comprises at least one of a ferritic steel matrix, a martensitic steel matrix, an austenitic steel matrix, a duplex steel matrix, or a precipitation hardened steel matrix.

20. The turbomachinery component of claim 15, wherein the turbomachinery component comprises a heavy-duty turbine wheel.

21. A method for manufacturing an article, comprising:
forming a first section comprising a nanostructured ferritic alloy, wherein the nanostructured ferritic alloy comprises from about 5 weight percentage to about 30 weight percentage chromium, from about 0.1 weight percentage to about 2 weight percentage titanium, from about 0 weight percentage to about 5 weight percentage molybdenum, from about 0 weight percentage to about 5 weight percentage tungsten, from about 0 weight percentage to about 5 weight percentage manganese, from about 0 weight percentage to about 5 weight percentage silicon, from about 0 weight percentage to about 2 weight percentage niobium, from about 0 weight percentage to about 2 weight percentage aluminum, from about 0 weight percentage to about 8 weight percentage nickel, from about 0 weight percentage to about 2 weight percentage tantalum, from about 0 weight percentage to about 0.5 weight percentage carbon, and from about 0 weight percentage to about 0.5 weight percentage nitrogen, with the balance weight percentage being iron and incidental impurities; and a number density of at least about $10^{18}$ m$^{-3}$ nanofeatures comprising titanium oxide and at least one element from an oxide added during formation of the nanostructured ferritic alloy, or from the alloy matrix;
forming a second section comprising at least one other alloy different from the nanostructured ferritic alloy; and
joining the first section to the second section; wherein the first section extends from an outer periphery to a predetermined surface located inward from the outer periphery, and the second section extends from an inner periphery to the predetermined surface located outward from the inner periphery.

22. The method of claim 21, further comprising performing a single heat treatment of the first section and the second section.

23. A method for manufacturing an article, comprising:
simultaneously forming a first section comprising a nanostructured ferritic alloy, and a second section comprising at least one other alloy different from the nanostructured ferritic alloy joined to the first section; wherein the first section extends from an outer periphery to a predetermined surface located inward from the outer periphery, and the second section extends from an inner periphery to the predetermined surface located outward from the inner periphery, wherein the nanostructured ferritic alloy comprises from about 5 weight percentage to about 30 weight percentage chromium, from about 0.1 weight percentage to about 2 weight percentage titanium, from about 0 weight percentage to about 5 weight percentage molybdenum, from about 0 weight percentage to about 5 weight percentage tungsten, from about 0 weight percentage to about 5 weight percentage manganese, from about 0 weight percentage to about 5 weight percentage silicon, from about 0 weight percentage to about 2 weight percentage niobium, from about 0 weight percentage to about 2 weight percentage aluminum, from about 0 weight percentage to about 8 weight percentage nickel, from about 0 weight percentage to about 2 weight percentage tantalum, from about 0 weight percentage to about 0.5 weight percentage carbon, and from about 0 weight percentage to about 0.5 weight percentage nitrogen, with the balance weight percentage being iron and incidental impurities; and a number density of at least about $10^{18}$ m$^{-3}$ nanofeatures comprising titanium oxide and at least one element from an oxide added during formation of the nanostructured ferritic alloy, or from the alloy matrix.

24. The method of claim 23, further comprising performing a single heat treatment of the first section and the second section.

* * * * *